United States Patent
Liang et al.

(10) Patent No.: US 12,162,752 B2
(45) Date of Patent: Dec. 10, 2024

(54) LITHIUM IRON MANGANESE PHOSPHATE PRECURSOR, LITHIUM IRON MANGANESE PHOSPHATE POSITIVE ELECTRODE MATERIAL AND PREPARATION METHOD THEREFOR, ELECTRODE MATERIAL, ELECTRODE, AND LITHIUM-ION BATTERY

(71) Applicant: Beijing Easpring Material Technology Co., Ltd., Beijing (CN)

(72) Inventors: Ce Liang, Beijing (CN); Yafei Liu, Beijing (CN); Yanbin Chen, Beijing (CN)

(73) Assignee: Beijing Easpring Material Technology Co., Ltd., Beijing (CN)

( * ) Notice: Subject to any disclaimer, the term of this patent is extended or adjusted under 35 U.S.C. 154(b) by 0 days.

(21) Appl. No.: 18/216,853

(22) Filed: Jun. 30, 2023

(65) Prior Publication Data
US 2023/0339756 A1    Oct. 26, 2023

Related U.S. Application Data

(63) Continuation of application No. PCT/CN2022/098044, filed on Jun. 10, 2022.

(30) Foreign Application Priority Data

Aug. 25, 2021  (CN) .......................... 202110981854.2
Aug. 30, 2021  (CN) .......................... 202111002582.3

(51) Int. Cl.
C01B 25/30    (2006.01)

(52) U.S. Cl.
CPC ........ *C01B 25/306* (2013.01); *C01P 2002/74* (2013.01); *C01P 2004/03* (2013.01);
(Continued)

(58) Field of Classification Search
CPC .............. C01B 25/306; C01P 2002/74; C01P 2004/03; C01P 2004/61; C01P 2004/64; C01P 2006/11; C01P 2006/40
See application file for complete search history.

(56) References Cited

U.S. PATENT DOCUMENTS

2017/0373316 A1* 12/2017 Shin ................. H01M 4/366

FOREIGN PATENT DOCUMENTS

| CN | 102024951 A | 4/2011 |
|---|---|---|
| CN | 103367746 A | 10/2013 |

(Continued)

OTHER PUBLICATIONS

International Search Report for PCT/CN2022/098044 dated Sep. 7, 2022 [PCT/ISA/210].

*Primary Examiner* — Daniel S Gatewood
(74) *Attorney, Agent, or Firm* — Sughrue Mion, PLLC

(57) ABSTRACT

An iron manganese phosphate precursor, a lithium iron manganese phosphate positive electrode material and a method for preparation thereof, an electrode material, an electrode, and a lithium-ion battery are disclosed. The lithium iron manganese phosphate precursor is represented by $(NH_4)Mn_{1-x-y}Fe_xM_yPO_4H_2O/C$, wherein $0.1 < x \leq 0.6$ and $0 \leq y \leq 0.04$, and M is selected from at least one of Mg, Co, Ni, Cu, Zn, and Ti. Lithium iron manganese phosphate positive electrode material prepared from the precursor is uniform in carbon coating, has a dense secondary spherical morphology, is high in compaction density, can improve the electrochemical performance of the lithium-ion battery when applied to the lithium-ion battery, is high in specific capacity and good in cycle performance.

16 Claims, 3 Drawing Sheets

(52) U.S. Cl.
CPC ...... *C01P 2004/61* (2013.01); *C01P 2004/64* (2013.01); *C01P 2006/11* (2013.01); *C01P 2006/40* (2013.01)

(56) References Cited

FOREIGN PATENT DOCUMENTS

| | | | | | |
|---|---|---|---|---|---|
| CN | 104167549 | A | * | 11/2014 | ............. C01B 25/45 |
| CN | 105226273 | A | | 1/2016 | |
| CN | 105514422 | A | | 4/2016 | |
| CN | 106328942 | A | | 1/2017 | |
| CN | 106935851 | A | | 7/2017 | |
| CN | 109103452 | A | | 12/2018 | |
| CN | 111900344 | A | * | 11/2020 | ............. C01B 25/26 |
| JP | 2017-69028 | A | | 4/2017 | |
| JP | 2019149356 | A | * | 9/2019 | |
| KR | 10-2016-0083630 | A | | 7/2016 | |
| KR | 10-2017-0098728 | A | | 8/2017 | |
| KR | 20170098728 | A | * | 8/2017 | |

* cited by examiner

LITHIUM IRON MANGANESE PHOSPHATE PRECURSOR, LITHIUM IRON MANGANESE PHOSPHATE POSITIVE ELECTRODE MATERIAL AND PREPARATION METHOD THEREFOR, ELECTRODE MATERIAL, ELECTRODE, AND LITHIUM-ION BATTERY

CROSS REFERENCE TO RELATED APPLICATIONS

This application is a continuation of International Application No. PCT/CN2022/098044, filed on Jun. 10, 2022, which claims the priority of Chinese Patent Application Nos. 202111002582.3 filed on Aug. 30, 2021 and No. 202110981854.2 filed on Aug. 25, 2021, the disclosure of which are incorporated by reference herein in their entireties.

FIELD OF THE INVENTION

The present invention relates to the technical field of lithium ion batteries, in particular to a lithium iron manganese phosphate precursor, a lithium iron manganese phosphate cathode material, a preparation method therefor, an electrode material, an electrode, and a lithium ion battery.

BACKGROUND OF THE INVENTION

In recent years, portable electronic devices, electric vehicles, and large-scale energy storage markets have been growing, and the demand for lithium ion batteries has been continuously increasing. The cathode material is used as a key component of the lithium ion battery, and puts higher requirements on the safety performance and the cost of the lithium ion battery while paying attention to high energy density. Lithium cobaltate is the first cathode material to realize commercial application, and the capacity can reach 150 mAh/g, but cobalt resources are relatively deficient, the price is high, and the lithium cobaltate has toxicity, so that the wide application and long-term development of the lithium cobaltate are severely limited. In order to reduce the cost and improve the energy density, the nickel-cobalt-manganese ternary material is rapidly developed and plays an important role in the field of power batteries, but still has the problem of higher cost and poorer safety performance. The olivine-type cathode material has the advantages of high safety performance and cost, and the lithium iron phosphate is applied in a large scale, and the voltage platform is low, so that the requirement of high energy density is difficult to meet. The lithium iron manganese phosphate has a higher voltage platform and energy density, has the characteristics of low cost, environmental friendliness and high safety performance of the lithium iron phosphate, and is widely concerned.

However, the olivine-type crystal structure limits the migration of lithium ions, resulting in low electronic and ionic conductivity of lithium iron manganese phosphate, affecting its capacity performance and rate capability. In order to improve the conductivity of the lithium iron manganese phosphate, the lithium iron manganese phosphate is modified by means of particle size reduction and carbon coating. This will decrease the compacted density of the lithium iron manganese phosphate and increase its specific surface area, thereby affecting the bulk energy density and processability of the material.

CN106328942A discloses a preparation method of a lithium iron manganese phosphate cathode material: and mixing a lithium source, a manganese source, an iron source, a phosphorus source solution and a pore-forming agent polymer solution to obtain a spinning solution, carrying out electrostatic spinning on the spinning solution to obtain a lithium iron manganese phosphate precursor, and sintering to further obtain the lithium iron manganese phosphate cathode material. The lithium iron manganese phosphate cathode material obtained by the method has high length-diameter ratio and porosity, and the rate capability of the battery is improved. However, the process adopts the electrostatic spinning technology to prepare the precursor, so that the process is complex, the cost is high, the production safety is higher, and the process is not beneficial to large-scale industrial application.

CN105514422A discloses a preparation method of a precursor and lithium iron manganese phosphate: mixing and reacting a water-soluble divalent manganese source, a divalent iron source, a divalent metal M salt and a precipitator, and drying to obtain pre-powder; then dispersing the pre-powder in water, adding soluble decomposable ferrous salt, and carrying out heat treatment to obtain the oxalate precursor; the precursor is mixed with a water-soluble lithium source, a phosphorus source and an organic carbon source, and the mixture is dried and roasted to obtain the lithium iron manganese phosphate with less metal dissolution and excellent cycle stability. However, the process adopts manganese iron oxalate as a precursor, has high gas generation in the sintering process, and is not beneficial to obtaining high compaction density.

CN105226273A discloses a lithium iron manganese phosphate and a preparation method thereof, which is characterized in that: respectively preparing lithium iron phosphate sol and lithium manganese phosphate sol by a sol-gel method; and calcining the lithium iron phosphate sol and the lithium manganese phosphate sol in an inert atmosphere to obtain the lithium iron manganese phosphate. The method can conveniently prepare the lithium iron manganese phosphate with any manganese-iron ratio, and is convenient to produce. However, the process is obtained by co-sintering lithium iron phosphate and lithium manganese phosphate, so that the two substances are difficult to be uniformly distributed, and the phenomenon that ferromanganese is independently enriched to generate phase separation affects the exertion of electrical properties is easy to occur.

SUMMARY OF THE INVENTION

The present invention aims to solve the problems of uneven element distribution, lower compaction density and low specific capacity of a lithium iron manganese phosphate cathode material in the prior art, and provides a lithium iron manganese phosphate precursor, a lithium iron manganese phosphate cathode material, a preparation method therefor, an electrode material, an electrode, and a lithium ion battery.

In order to achieve the above object, the first aspect of the present invention provides a lithium iron manganese phosphate precursor, where the expression of the precursor is $(NH_4)Mn_{1-x-y}Fe_xM_yPO_4 \cdot H_2O/C$, where $0.1<x\le0.6$ and $0\le y\le0.04$, and M is selected from at least one of Mg, Co, Ni, Cu, Zn and Ti.

The second aspect of the present invention provides a method for preparing a lithium iron manganese phosphate precursor, including:
(a) providing a first mixed solution containing a manganese source, an iron source, and optionally an M source; providing a second mixed solution containing a phosphorus source and an ammonia source; providing a third mixed solution containing a complexing agent and a first carbon source;

(b) adding the first mixed solution and the second mixed solution into the third mixed solution for coprecipitation reaction to obtain first slurry;

(c) and carrying out solid-liquid separation and washing on the first slurry to obtain a lithium iron manganese phosphate precursor.

The third aspect of the invention provides a lithium iron manganese phosphate cathode material, wherein the expression of the cathode material is $Li_iMn_{1-x-y-z}Fe_xM'_z(PO_4)_{1-n}N_n/C$, wherein $0.1<x≤0.6$, $0≤y≤0.04$, $0≤z≤0.04$, $0.9<i≤1.2$ and $0≤n≤0.04$, and z and n are not 0 at the same time.

M is selected from at least one of Mg, Co, Ni, Cu, Zn and Ti; M' is selected from at least one of Mg, Ca, Sr, Ti, V, Cr, Co, Ni, Cu, Zn, Zr, Y, Mo, Nb, B, Al, W, La and Sm; N is selected from F and/or Cl.

The fourth aspect of the invention provides a method for preparing a lithium iron manganese phosphate cathode material, which comprises the following steps:

(1) providing a lithium iron manganese phosphate precursor with an expression $(NH_4)Mn_{1-x-y}Fe_xM_yPO_4·H_2O/C$, wherein $0.1<x≤0.6$ and $0≤y≤0.04$, and M is selected from at least one of Mg, Co, Ni, Cu, Zn and Ti;

(2) in the presence of a solvent, mixing and homogenizing the lithium iron manganese phosphate precursor, a lithium source, a second carbon source, an M' source and/or an N source to obtain a second slurry;

(3) and removing the solvent in the second slurry to obtain a dry material, and calcining the dry material under the protection of an inert atmosphere to obtain the lithium iron manganese phosphate cathode material.

The fifth aspect of the present invention provides an electrode material, which contains an active material, a conductive agent, and a binder, where the active material is the lithium iron manganese phosphate cathode material according to the third aspect or the lithium iron manganese phosphate cathode material prepared by the method according to the fourth aspect.

The sixth aspect of the present invention provides an electrode, which includes a current collector and an electrode material coated and/or filled on the current collector, where the electrode material is the electrode material according to the fifth aspect.

The seventh aspect of the present invention provides a method for preparing an electrode, the method including coating and/or filling a slurry containing an active material, a conductive agent, a binder and a solvent on a current collector, drying, rolling or not, wherein the active material is the lithium iron manganese phosphate cathode material according to the third aspect or the lithium iron manganese phosphate cathode material prepared by the method according to the fourth aspect.

In an eighth aspect, the invention provides a lithium ion battery, which includes an electrode assembly and an electrolyte, the electrode assembly and the electrolyte being sealed within a battery housing, the electrode assembly includes a positive electrode, a negative electrode and a separator, the separator being located between the positive electrode and the negative electrode, and the positive electrode is the electrode according to the sixth aspect or the electrode prepared by the method according to the seventh aspect.

Through the technical scheme, the present invention has the following advantages:

(1) the lithium iron manganese phosphate precursor provided by the present invention has a secondary spherical particle structure formed by primary particles, an XRD spectrogram shows that the precursor has a crystal structure with an orthogonal structure, elements in the precursor are uniformly distributed, doped elements enter metal sites to form nano particles with a stable structure, and the surfaces of the nano particles are coated with carbon to form compact spherical aggregates; The compaction density of the lithium iron manganese phosphate cathode material prepared using the precursor provided by the present invention is high.

(2) the lithium iron manganese phosphate cathode material provided by the present invention has the advantages that the primary particles show that the lithium iron manganese phosphate cathode material forms stable carbon coating, the carbon coating is uniform, and the lithium iron manganese phosphate cathode material has compact secondary sphere shape, when the cathode material provided by the present invention is applied to a lithium-ion battery, it can improve the electrochemical performance, specific capacity, and cycling performance of the lithium-ion battery.

(3) according to the method for preparing the lithium iron manganese phosphate precursor and the cathode material, provided by the present invention, the uniformity of element distribution in the precursor and the cathode material can be improved and the stability of the material structure can be improved through secondary doping and secondary carbon coating, so that higher compaction density and electrochemical performance can be obtained, and the method is simple in process and suitable for industrial production.

DETAILED DESCRIPTION OF THE EMBODIMENTS

Figure 1:
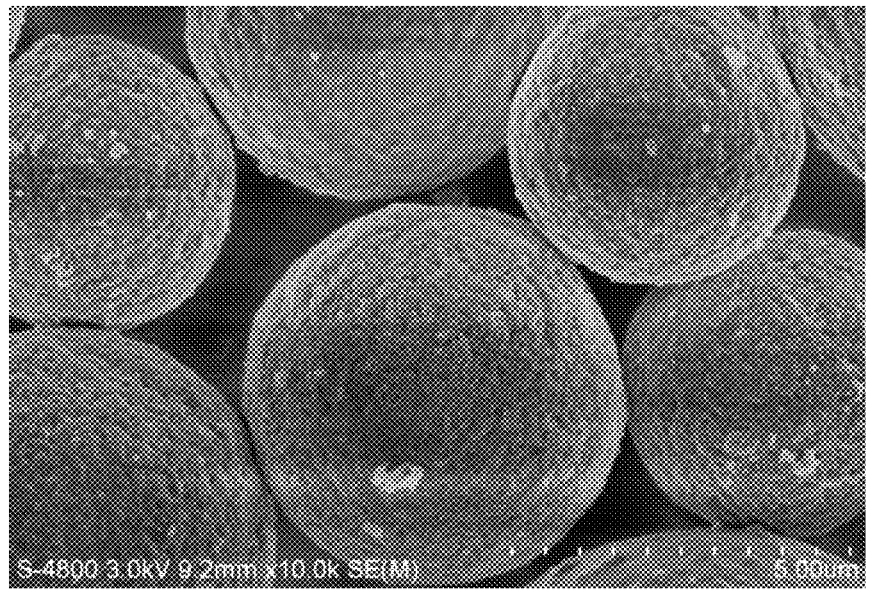
FIG. 1 is a scanning electron microscope image of a lithium iron manganese phosphate precursor Z1 prepared in Preparation example 1.

The endpoints and any values of the ranges disclosed herein are not limited to the precise range or value, and these ranges or values should be understood as including values close to these ranges or values. For numerical ranges, the endpoint values of each range, the endpoint values of each range and individual point values, and individual point values may be combined with each other to obtain one or more new numerical ranges, and these numerical ranges should be considered to be specifically disclosed herein.

In a first aspect, the present invention provides a lithium iron manganese phosphate precursor, which has an expression of $(NH_4)Mn_{1-x-y}Fe_xM_yPO_4 \cdot H_2O/C$, wherein $0.1 < x \le 0.6$ and $0 \le y \le 0.04$, and M is selected from at least one of Mg, Co, Ni, Cu, Zn and Ti.

In some embodiments of the present invention, the object of the present invention can be achieved even if the content of carbon element in the lithium iron manganese phosphate precursor is relatively low. Preferably, the carbon element content in the precursor is 0.05-5 wt %, preferably 0.5-2 wt %, more preferably 1-1.4 wt %, based on the total weight of the precursor.

In some embodiments of the present invention, it is preferable that in the expression of the precursor, $0.19 \le x \le 0.39$ and $0.01 \le y \le 0.04$.

In some embodiments of the present invention, preferably, M is selected from at least one of Mg, Cu and Ti.

In some embodiments of the present invention, it is preferable that the precursor has a secondary spherical particle structure formed of primary particles; preferably, the average particle size of the secondary spherical particles is from 1 μm to 50 μm, preferably from 5 μm to 12 μm; the secondary spherical particles are spherical or spheroidal. Preferably, the primary particles of the precursor have an average particle size of 10 nm to 500 nm, preferably 40 nm to 100 nm; the surfaces of the primary particles are coated with carbon, so that the compactness of the primary particles agglomerated into secondary spherical particles can be enhanced, and a graphite carbon construction conductive network can be formed.

In some embodiments of the present invention, preferably, in the XRD diffractogram of said precursor under CuKa radiation, the most intense diffraction peak appears in the range of $2\theta=9.5°-10.5°$, and a diffraction peak with a slightly weaker intensity appears around $2\theta=31.4°$, showing the crystal structure of orthorhombic system. The crystal structure of the precursor can be determined by XRD characterization.

A second aspect of the present invention provides a method for preparing a lithium iron manganese phosphate precursor, including:
(a) providing a first mixed solution containing a manganese source, an iron source, and optionally an M source; providing a second mixed solution containing a phosphorus source and an ammonia source; providing a third mixed solution containing a complexing agent and a first carbon source;
(b) adding the first mixed solution and the second mixed solution into the third mixed solution for coprecipitation reaction to obtain first slurry;
(c) and carrying out solid-liquid separation and washing on the first slurry to obtain a lithium iron manganese phosphate precursor.

In some embodiments of the present invention, preferably, in step (a), the manganese source is selected from at least one of manganese sulfate, manganese nitrate, manganese acetate and manganese chloride.

In some embodiments of the present invention, preferably, in the step (a), the iron source is selected from at least one of ferric sulfate, ferrous sulfate, ferric nitrate, ferric acetate and ferric chloride.

In some embodiments of the present invention, preferably, in step (a), the M source is selected from at least one of sulfate, nitrate, acetate and chloride containing M.

In some embodiments of the present invention, preferably, in step (a), the phosphorus source is selected from at least one of phosphoric acid, ammonium monohydrogen phosphate, ammonium dihydrogen phosphate and triammonium phosphate, preferably at least one of phosphoric acid, ammonium monohydrogen phosphate and ammonium dihydrogen phosphate.

In some embodiments of the present invention, preferably, in step (a), the ammonia source is selected from at least one of ammonia water, ammonium monohydrogen phosphate, ammonium dihydrogen phosphate, triammonium phosphate, ammonium bicarbonate, ammonium carbonate, ammonium sulfate and urea, preferably at least one of ammonia water, ammonium monohydrogen phosphate and ammonium dihydrogen phosphate.

In some embodiments of the present invention, preferably, in step (a), the complexing agent is selected from citric acid and/or triammonium citrate.

In some embodiments of the present invention, preferably, in step (a), the first carbon source is selected from at least one of graphene, carbon nanotubes, phenolic resin, polyethylene, polyvinylidene fluoride (PVDF), Polytetrafluoroethylene (PTFE), polypropylene and toluene diisocyanate (TDI), and is preferably at least one of graphene, carbon nanotubes, phenolic resin, polyethylene and polyvinylidene fluoride.

In some embodiments of the present invention, it is preferred that the manganese source, the iron source, and the M source are used in amounts such that: the molar ratio of the manganese source, the iron source and the M source is 60-80:20-40:1; the selection of the manganese source, the iron source and the M source within the molar ratio range is favorable for obtaining a lithium iron manganese phosphate precursor with stable structure, and the improvement of the structural stability of the lithium iron manganese phosphate cathode material is favorable for the lithium iron manganese phosphate cathode material to have higher energy density.

In some embodiments of the invention, the phosphorus source and the ammonia source are preferably used in amounts such that: the molar ratio of the phosphorus source calculated by phosphate ions to the ammonia source calculated by ammonium ions is 1:1-3, selecting the phosphorus source and the ammonia source with the molar ratio range to facilitate uniform complexation of manganese element, iron element and optional M element to generate a stable lithium iron manganese phosphate precursor.

In some embodiments of the present invention, preferably, the concentration of the total metal ions in the first mixed solution is 0.5 mol/L to 3 mol/L.

In some embodiments of the present invention, it is preferable that the concentration of phosphate ions in the second mixed solution is 0.5 mol/L to 3 mol/L, and the concentration of ammonium ions is 0.05 mol/L to 15 mol/L.

In some embodiments of the present invention, preferably, the concentration of the complexing agent in the third mixed solution is 0.03 mol/L to 10 mol/L.

In some embodiments of the present invention, preferably, in step (b), the first mixed solution and the second mixed solution are added to the third mixed solution in a concurrent manner;

preferably, the coprecipitation reaction is performed under stirring, and the conditions of the coprecipitation reaction include: the stirring speed is 500-1000 rpm, the pH is 2-8, the temperature is 25-90° C., and the time is 1-2 h. The pH of the coprecipitation reaction can be controlled to 2-8 (the pH can be within a range of ±0.5) by adjusting the rate of addition of the second mixed solution.

In some embodiments of the present invention, the solid-liquid separation mode is not particularly limited, and the conventional techniques known to those skilled in the art may be used, and for example, the solid-liquid separation may be performed by suction filtration or pressure filtration to obtain a solid material.

In some embodiments of the present invention, the washing manner is not particularly limited, and any washing manner that is conventional in the art may be applied to the present invention, and preferably, in step (c), the solid material obtained by solid-liquid separation is washed with pure water until the conductivity of the filtrate is less than or equal to 200 μs/cm, so as to obtain the lithium iron manganese phosphate precursor.

The third aspect of the present invention provides a lithium iron manganese phosphate cathode material, wherein the expression of the cathode material is $Li_iMn_{1-x-y-z}Fe_xM_yM'_z(PO_4)_{1-n}N_n/C$, wherein $0.1<x\leq0.6$, $0\leq y\leq 0.04$, $0\leq z\leq 0.04$, $0.9<i\leq 1.2$ and $0\leq n\leq 0.04$, and z and n are not 0 at the same time;

M is selected from at least one of Mg, Co, Ni, Cu, Zn and Ti; M' is selected from at least one of Mg, Ca, Sr, Ti, V, Cr, Co, Ni, Cu, Zn, Zr, Y, Mo, Nb, B, Al, W, La and Sm; N is selected from F and/or Cl.

In some embodiments of the present invention, the object of the present invention can be achieved even if the content of carbon element in the lithium iron manganese phosphate cathode material is relatively low. Preferably, the content of the carbon element in the cathode material is 0.5 wt % to 10 wt %, preferably 1 wt % to 3 wt %, more preferably 1.8 wt % to 3 wt %, based on the total weight of the cathode material.

In some embodiments of the present invention, preferably, in the expression of the cathode material, $0.19\leq x\leq 0.39$, $0.01\leq y\leq 0.04$, $0.01\leq z\leq 0.04$, $1\leq i\leq 1.1$ and $0.01\leq n\leq 0.04$;

more preferably, in the expression of the cathode material, $0.19\leq x\leq 0.39$, $0.01\leq y\leq 0.04$, $0.01\leq z\leq 0.02$, $1.02\leq i\leq 1.05$ and $0.01\leq n\leq 0.02$.

In some embodiments of the present invention, preferably, M is selected from at least one of Mg, Cu and Ti.

In some embodiments of the present invention, preferably, M' is selected from at least one of Ti, Nb and B.

In some embodiments of the invention, preferably, N is F.

In some embodiments of the present invention, preferably, M and/or M' are distributed in a gradient on the surface of the cathode material.

In some embodiments of the present invention, preferably, the XRD spectrum of the cathode material shows the strongest diffraction peak in the range of 2θ=35° to 36°, and distinct diffraction peaks around 17.8°, 25.5°, 29.6° and 36.4° of 2θ, respectively, showing the crystal structure of orthorhombic system.

In some embodiments of the present invention, preferably, the cathode material has a secondary spherical particle structure formed of primary particles; preferably, the average particle size of the secondary spherical particles is from 1 μm to 50 μm, preferably from 7 μm to 15 μm; preferably, the secondary spherical particles are spherical or spheroidal. Preferably, the average particle size of the primary particles of the cathode material is 10 nm to 500 nm, preferably 60 nm to 100 nm; in the cathode material, the surface of primary particles is uniformly coated with carbon, the agglomerated secondary spherical particles have compact structures and stable doping structures, and the surface of the secondary spherical particles is doped with anions and/or metal ions in gradient distribution and is combined with uniform carbon coating, so that when the lithium iron manganese phosphate cathode material is applied to a lithium ion battery, the electrochemical performance of the lithium ion battery can be improved, the specific capacity is high, and the cycle stability is good.

In some embodiments of the present invention, preferably, the compacted density of the cathode material is 1.5-2.5 g/cm³, the specific capacity at 0.1C rate is 145-160 mAh/g, and the capacity retention rate after 80 cycles is 85-97%;

more preferably, the compaction density of the cathode material is 2.09-2.31 g/cm³, the specific capacity at 0.1C rate is 152.1-157.2 mAh/g, and the capacity retention rate after 80 cycles is 92.6-95.9%.

The fourth aspect of the present invention provides a method for preparing a lithium iron manganese phosphate cathode material, which comprises the following steps:

(1) providing a lithium iron manganese phosphate precursor with an expression $(NH_4)Mn_{1-x-y}Fe_xM_yPO_4 \sim H_2O/C$, wherein $0.1<x\leq 0.6$ and $0\leq y\leq 0.04$, and M is selected from at least one of Mg, Co, Ni, Cu, Zn and Ti.

(2) in the presence of a solvent, mixing and homogenizing the lithium iron manganese phosphate precursor, a lithium source, a second carbon source, an M' source and/or an N source to obtain a second slurry;

(3) and removing the solvent in the second slurry to obtain a dry material, and calcining the dry material under the protection of an inert atmosphere to obtain the lithium iron manganese phosphate cathode material.

In some embodiments of the present invention, preferably, in step (1), the lithium iron manganese phosphate precursor expressed as $(NH_4)Mn_{1-x-y}Fe_xM_yPO_4 \cdot H_2O/C$ may be selected as described above, and will not be described herein again.

In some embodiments of the present invention, preferably, in the step (2), the lithium source is selected from at least one of lithium oxide, lithium hydroxide, lithium chloride, lithium nitrate, lithium nitrite, lithium formate, lithium acetate, lithium oxalate, lithium carbonate, lithium phosphate, dilithium hydrogen phosphate, lithium dihydrogen phosphate and lithium citrate, and is preferably at least one of lithium carbonate, lithium hydroxide and lithium chloride.

In some embodiments of the present invention, preferably, in step (2), the second carbon source is selected from at least one of glucose, sucrose, fructose, cellulose, starch, citric acid, polyacrylic acid, polyethylene glycol and dopamine, preferably at least one of glucose, sucrose, starch and cellulose.

In some embodiments of the present invention, preferably, in step (2), the M' source is selected from oxygenated compounds containing M' and/or chlorides containing M', preferably, the oxygenated compounds containing M' are at least one of sulfates, nitrates, acetates, oxides, and acids; more preferably, the M' source is selected from at least one of titanium dioxide, niobium pentoxide, and boric acid.

In some embodiments of the present invention, preferably, in step (2), the N source is selected from at least one of ammonium fluoride, ammonium bifluoride, lithium fluoride, ammonium chloride and lithium chloride, preferably lithium fluoride.

In some embodiments of the present invention, it is preferable that the molar ratio of the lithium iron manganese phosphate precursor, the lithium source, the M' source, and/or the N source to the second carbon source is 1:0.52-1.05:0.005-0.0.1:0.5-1. The lithium iron manganese phosphate precursor, the lithium source, the M' source and/or the N source and the second carbon source with the molar ratio in the range are selected, so that the electronic conductivity and the ionic conductivity of the cathode material are improved, and the higher electrical property is obtained.

In some embodiments of the present invention, the method for mixing and homogenizing is not particularly limited, and for example, the mixing and homogenizing may be performed by a mechanical stirring manner to form a uniform second slurry. The temperature of stirring and the rate of stirring are also not particularly limited, and is based on the ability to form a uniform second slurry.

In some embodiments of the present invention, the kind of the solvent is not particularly limited, so long as the solvent can form a uniform second slurry, and for example, the solvent may be water, ethanol, or the like, and is preferably water; the amount of the solvent used is not particularly limited, and is also based on the ability to form a uniform second slurry.

In some embodiments of the present invention, in step (3), the solvent in the second slurry may be removed by direct evaporation, and the temperature and process of evaporation may be known to those skilled in the art, for example, static drying or spray drying may be used to remove the solvent in the second slurry.

In some embodiments of the present invention, preferably, the calcination is performed under protection of an inert atmosphere, which may be a nitrogen atmosphere and/or an argon atmosphere;

the calcination conditions include: the calcination temperature is 500-1000° C., and preferably 600-800° C.; the calcination time is 4-20 h, preferably 6-12 h.

According to a preferred embodiment of the present invention, the method for preparing the lithium iron manganese phosphate cathode material comprises:

(S1) providing a first mixed solution containing a manganese source, an iron source, and an M source, and providing a second mixed solution containing a phosphorus source and an ammonia source; providing a third mixed solution containing a complexing agent and a first carbon source;

(S2) adding the first mixed solution and the second mixed solution into the third mixed solution for coprecipitation reaction to obtain a first slurry;

(S3) carrying out solid-liquid separation and washing on the first slurry to obtain a lithium iron manganese phosphate precursor;

(S4) in the presence of a solvent, mixing and homogenizing the obtained lithium iron manganese phosphate precursor, a lithium source, a second carbon source, an M' source and/or an N source to obtain a second slurry;

(S5) removing the solvent in the second slurry to obtain a dry material, and calcining the dry material under the protection of inert atmosphere to obtain the lithium iron manganese phosphate cathode material.

In some embodiments of the present invention, in the method for preparing the lithium iron manganese phosphate cathode material, doping elements can effectively enter metal sites through precursor doping to form a stable structure; carbon source coating is introduced through the precursor, so that carbon distributed on the surface of the primary particles can be uniformly coated to form a stable conductive network, and the primary particles are tightly bonded and agglomerated to form compact secondary spherical particles; and then the materials are mixed and sintered in a secondary doping and carbon coating mode, so that gradient doping of different elements and coating of different carbon sources can be realized. The preparation method is simple in process, good doping and coating effects can be achieved, and the prepared lithium iron manganese phosphate cathode material has high compaction density and electrochemical performance.

The fifth aspect of the present invention provides an electrode material, which contains an active material, a conductive agent, and a binder, where the active material is the lithium iron manganese phosphate cathode material of the third aspect or the lithium iron manganese phosphate cathode material prepared by the method of the fourth aspect.

The sixth aspect of the present invention provides an electrode, which includes a current collector and an electrode material coated and/or filled on the current collector, where the electrode material is the electrode material according to the fifth aspect.

The seventh aspect of the present invention provides a method for preparing an electrode, the method including coating and/or filling a slurry containing an active material, a conductive agent, a binder and a solvent on a current collector, drying, rolling or not, wherein the active material is the lithium iron manganese phosphate cathode material according to the third aspect or the lithium iron manganese phosphate cathode material prepared by the method according to the fourth aspect.

In an eighth aspect, the present invention provides a lithium ion battery, which includes an electrode assembly and an electrolyte, the electrode assembly and the electrolyte are sealed in a battery case, the electrode assembly includes a positive electrode, a negative electrode and a separator, the separator is located between the positive electrode and the negative electrode, and the positive electrode is the electrode according to the sixth aspect or the electrode prepared by the method according to the seventh aspect.

Since the present invention relates only to the improvement of the active material contained in the electrode material of the prior art, there is no particular limitation on other compositions and structures of the lithium ion battery.

For example, for the positive electrode of a lithium ion battery, the content and the type of the conductive agent of the cathode material according to the present invention are well known to those skilled in the art, the conductive agent may be one or more selected from conductive carbon black (Super-P), acetylene black, ketjen black, graphene and carbon nanotubes, and carbon nanotubes are preferably used as the conductive agent in the present invention.

The binder of the cathode material of the present invention may be any binder known in the art to be used for lithium ion batteries. May be selected from one or more of a fluorine-containing resin and/or a polyolefin compound such as Polytetrafluoroethylene (PTFE), polyvinylidene fluoride (PVDF) and styrene butadiene rubber, with polyvinylidene fluoride being preferred as the binder in the present invention.

In some embodiments of the present invention, preferably, the mass ratio of the lithium iron manganese phosphate cathode material, the conductive agent and the binder is 80-96:10-2:10-2, preferably 90:5:5.

The current collector of the present invention may be any current collector known to those skilled in the art, such as aluminum foil, copper foil, nickel-plated steel strip, etc. The present invention selects the aluminum foil as the current collector.

The solvent used in the present invention may be any solvent known in the art that can be used in the preparation of electrodes for lithium ion batteries, and may be, for example, ethanol and/or N-methylpyrrolidone (NMP), preferably N-methylpyrrolidone. The amount of solvent used is such that the desired coating slurry can be formed.

In some embodiments of the present invention, a lithium metal sheet may be used as the negative electrode of a lithium ion battery.

In some embodiments of the present invention, the electrolyte of the lithium ion battery may be an electrolyte conventionally used in the art, the concentration of the electrolyte is generally 0.2 mol/L to 8 mol/L, and an equal amount of mixed solution of 1 mol/L of $LiPF_6$, ethylene carbonate (EC) and diethyl carbonate (DEC) is selected as the electrolyte in the present invention.

The separator of the present invention has an electrical insulating property and a liquid retaining property, is disposed between a positive electrode and a negative electrode, and is sealed in a battery can together with the positive electrode, the negative electrode, and an electrolyte. The separator can be various separator commonly used in the field, such as various production brands of polyethylene, polypropylene, modified polyethylene felt, modified polypropylene felt, superfine glass fiber felt, vinylon felt or a composite film formed by welding or bonding nylon felt and a wettable polyolefin microporous membrane, which are produced by various manufacturers known by the person in the field. The present invention selects polyethylene porous film as the separator.

The present invention will be described in detail below by way of examples.

The information such as the composition of the material, the structure or morphology of the atoms or molecules in the material, etc. is obtained by XRD. The XRD diffractometer is XRD-6000 X-ray powder diffractometer (Shimadzu, Japan), and the test conditions of XRD are as follows: the Cu target was irradiated with K α rays (wavelength λ 0.154 nm), tube voltage 40 kV, tube current 200 mA, and scanning speed 10° (2θ)/min.

The surface topography of the material was characterized by Scanning Electron Microscopy (SEM). The model of the adopted scanning electron microscope is S-4800 (the manufacturer is Hitachi, Japan), and the testing conditions of the scanning electron microscope are as follows: the accelerating voltage is 1 kV, and the amplification factor is 10K. The average particle size of the primary particles and the secondary spherical particles in the material is obtained by measuring a scanning electron microscope picture.

Elemental carbon (C) was analyzed on an Elementar Micro Cube elemental analyzer. The specific operating method and conditions are as follows: weighing 1-2 mg of a sample in a tin cup, placing the sample into an automatic sample feeding disc, feeding the sample into a combustion tube through a ball valve for combustion, wherein the combustion temperature is 1000° C. (for removing atmospheric interference during sample feeding, helium gas is adopted for purging), reducing the combusted gas by using reducing copper to form carbon dioxide, and then detecting the carbon dioxide by using a TCD detector.

In the respective expressions of the precursor and the cathode material, the elements and the contents thereof are obtained by an inductively coupled plasma spectrometer (ICP) test, and the apparatus is purchased from Perkin Elmer Instrument Co., Ltd, and is PE-7000DV in model.

Preparation examples 1 to 7 are for explaining a lithium iron manganese phosphate precursor and a preparation method thereof.

Preparation Example 1

(a) Manganese sulfate, ferric sulfate and magnesium sulfate (all calculated on metal elements) are mixed according to a molar ratio of 70:29:1 in pure water to obtain 2 L of a first mixed solution with the total metal ion concentration of 2 mol/L; mixing phosphoric acid and ammonia water according to the molar ratio of 1:3, and adding pure water to obtain 4 L of second mixed solution with the phosphate radical ion concentration of 1 mol/L; adding PVDF and triammonium citrate into 1 L of pure water to obtain a third mixed solution, wherein the concentration of a complexing agent in the third mixed solution is 0.05 mol/L, and the third mixed solution is used as a reaction base solution;

(b) adding the third mixed solution into a reaction kettle, controlling the temperature at 60° C., dropwise adding the first mixed solution and the second mixed solution into the reaction kettle in a concurrent manner at the stirring speed of 800 rpm, and controlling the pH value in the reaction system to be 6.0±0.5 by adjusting the adding speed of the second mixed solution; after the feeding is finished, continuously stirring for 1 h to obtain first slurry;

(c) and carrying out suction filtration on the first slurry, and washing the first slurry by using pure water until the conductivity of the filtrate is less than or equal to 200 μs/cm to obtain a lithium iron manganese phosphate precursor Z1/with the expression of $(NH_4)Mn_{0.7}Fe_{0.29}Mg_{0.01}PO_4 \cdot H_2O/C$, wherein the carbon content in Z1 is 1.2 wt % based on the total weight of the precursor Z1.

FIG. 1 is a scanning electron micrograph of Z1, from which it can be seen that the precursor Z1 has a secondary spherical particle structure formed of primary particles, the primary particles being bonded densely, wherein the average particle size of the primary particles is 80 nm and the average particle size of the secondary spherical particles is 8 μm.

Figure 4:
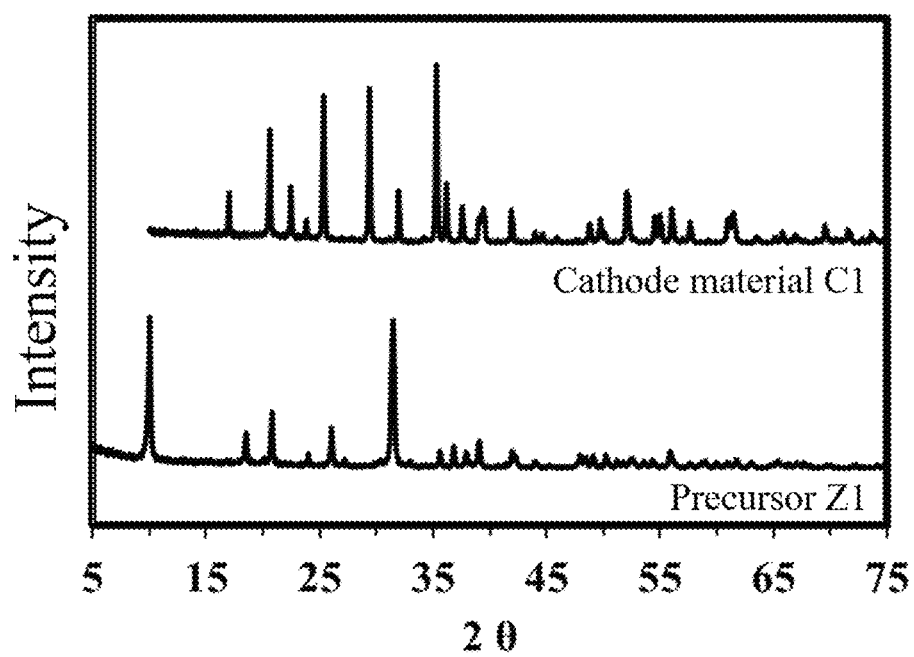
FIG. 4 is an XRD pattern of the lithium iron manganese phosphate precursor Z1 obtained in Preparation example 1 and the lithium iron manganese phosphate cathode material C1 obtained in Example 1.

The XRD spectrum of the precursor Z1 is shown in FIG. 4, from which it can be seen that distinct characteristic peaks appear at 2θ=10.0° and 31.5°, indicating that Z1 has the crystal structure of orthorhombic system.

Preparation Example 2

(a) Manganese sulfate, ferric sulfate and magnesium sulfate (all calculated on metal elements) are mixed according to a molar ratio of 60:39:1 in pure water to obtain 2 L of a first mixed solution with the total metal ion concentration of 2 mol/L; mixing phosphoric acid and ammonia water according to a molar ratio of 1:3, and adding pure water to obtain 4 L of second mixed solution with the phosphate radical ion concentration of 1 mol/L; adding graphene and triammonium citrate into 1 L of pure water to obtain a third mixed solution, wherein the concentration of a complexing agent in the third mixed solution is 0.05 mol/L, and the third mixed solution is used as a reaction base solution;

(b) adding the third mixed solution into a reaction kettle, controlling the temperature at 60° C., dropwise adding the first mixed solution and the second mixed solution into the reaction kettle in a concurrent manner at the stirring speed of 600 rpm, and controlling the pH value in the reaction system to be 6.0±0.5 by adjusting the adding speed of the second mixed solution; after the feeding is finished, continuously stirring for 1 h to obtain first slurry;

(c) and carrying out suction filtration on the first slurry, and washing the first slurry by using pure water until the conductivity of the filtrate is less than or equal to 200 μs/cm to obtain a lithium iron manganese phosphate precursor Z2 with the expression of $(NH_4)Mn_{0.6}Fe_{0.39}Mg_{0.01}PO_4 \cdot H_2O/C$, wherein the carbon content in Z2 is 1.2 wt % based on the total weight of the precursor Z2.

Through scanning electron microscopy, it can be observed that the precursor Z2 has a secondary spherical particle structure formed by primary particles, and the primary particles are bonded compactly, wherein the average particle size of the primary particles is 50 nm, and the average particle size of the secondary spherical particles is 10 μm.

As a result of XRD detection, the precursor Z2 had an orthorhombic crystal structure.

Preparation Example 3

(a) Manganese chloride, ferric chloride and copper sulfate (all calculated on metal elements) are mixed according to a molar ratio of 70:29:1 in pure water to obtain 2 L of a first mixed solution with the total metal ion concentration of 2 mol/L; adding ammonium monohydrogen phosphate serving as a phosphorus source and an ammonia source into pure water to obtain 2 L of second mixed solution with the concentration of 2 mol/L; adding the carbon nano tube and citric acid into 1 L of pure water to obtain a third mixed solution, wherein the concentration of the complexing agent in the third mixed solution is 0.05 mol/L, and the third mixed solution is used as a reaction base solution;

(b) adding the third mixed solution into a reaction kettle, controlling the temperature at 80° C., dropwise adding the first mixed solution and the second mixed solution into the reaction kettle in a concurrent manner at the stirring speed of 800 rpm, and controlling the pH value in the reaction system to be 5.2±0.5 by adjusting the adding speed of the second mixed solution; after the feeding is finished, continuously stirring for 1 h to obtain first slurry;

(c) and carrying out suction filtration on the first slurry, and washing the first slurry by using pure water until the conductivity of the filtrate is less than or equal to 200 μs/cm to obtain a lithium iron manganese phosphate precursor Z3 with the expression of $(NH_4)Mn_{0.7}Fe_{0.29}Cu_{0.01}PO_4 \cdot H_2O/C$, wherein the carbon content in Z3 is 1.0 wt % based on the total weight of the precursor Z3.

Through scanning electron microscopy, it can be observed that the precursor Z3 has a secondary spherical particle structure formed by primary particles, and the primary particles are bonded compactly, wherein the average particle size of the primary particles is 100 nm, and the average particle size of the secondary spherical particles is 12 μm.

As a result of XRD detection, the precursor Z3 had an orthorhombic crystal structure.

Preparation Example 4

(a) Manganese acetate, iron acetate and titanium acetate (all calculated as metal elements) are mixed according to a molar ratio of 80:19:1 in pure water to obtain 2 L of a first mixed solution with the total metal ion concentration of 2 mol/L; adding ammonium dihydrogen phosphate serving as a phosphorus source and an ammonia source into pure water to obtain 2 L of second mixed solution with the concentration of 2 mol/L; adding phenolic resin and citric acid into 1 L of pure water to obtain a third mixed solution, wherein the concentration of a complexing agent in the third mixed solution is 0.06 mol/L, and the third mixed solution is used as a reaction bottom solution;

(b) adding the third mixed solution into a reaction kettle, controlling the temperature at 90° C., dropwise adding the first mixed solution and the second mixed solution into the reaction kettle in a concurrent manner at the stirring speed of 1000 rpm, and controlling the pH value in the reaction system to be 5.2±0.5 by adjusting the adding speed of the second mixed solution; after the feeding is finished, continuously stirring for 1 h to obtain first slurry;

(c) and carrying out suction filtration on the first slurry, and washing the first slurry by using pure water until the conductivity of the filtrate is less than or equal to 200 μs/cm to obtain a lithium iron manganese phosphate precursor Z4 with the expression of $(NH_4)Mn_{0.8}Fe_{0.19}Ti_{0.01}PO_4 \cdot H_2O/C$, wherein the carbon content in Z4 is 1.1 wt % based on the total weight of the precursor Z4.

Through scanning electron microscopy, it can be observed that the precursor Z4 has a secondary spherical particle structure formed by primary particles, and the primary particles are bonded compactly, wherein the average particle size of the primary particles is 80 nm, and the average particle size of the secondary spherical particles is 10 μm.

As a result of XRD detection, the precursor Z4 had an orthorhombic crystal structure.

Preparation Example 5

(a) Manganese nitrate, iron nitrate, copper nitrate (all calculated as metal elements) are mixed in a molar ratio of 70:29:1 in pure water to obtain 2 L of a first mixed solution with the total metal ion concentration of 1.5 mol/L; adding ammonium monohydrogen phosphate serving as a phosphorus source and an ammonia source into pure water to obtain 2 L of second mixed solution with the concentration of 1.5 mol/L; adding polyethylene and triammonium citrate into 1 L of pure water to obtain a third mixed solution, wherein the concentration of a complexing agent in the third mixed solution is 0.03 mol/L, and the third mixed solution is used as a reaction base solution;

(b) adding the third mixed solution into a reaction kettle, controlling the temperature at 40° C., dropwise adding the first mixed solution and the second mixed solution into the reaction kettle in a concurrent manner at the stirring speed of 900 rpm, and controlling the pH value in the reaction system to be 4.5±0.5 by adjusting the adding speed of the second mixed solution; after the feeding is finished, continuously stirring for 1 h to obtain first slurry;

(c) and carrying out suction filtration on the first slurry, and washing the first slurry by using pure water until the conductivity of the filtrate is less than or equal to 200 μs/cm to obtain a lithium iron manganese phosphate precursor Z5 with the expression of $(NH_4)Mn_{0.7}Fe_{0.29}Cu_{0.01}PO_4 \cdot H_2O/C$, wherein the carbon content in Z5 is 1.4 wt % based on the total weight of the precursor Z5.

Through scanning electron microscopy, it can be observed that the precursor Z5 has a secondary spherical particle structure formed by primary particles, and the primary particles are bonded compactly, wherein the average particle size of the primary particles is 50 nm, and the average particle size of the secondary spherical particles is 6 μm.

As a result of XRD detection, the precursor Z5 had an orthorhombic crystal structure.

Preparation Example 6

(a) Manganese sulfate, ferric sulfate and magnesium sulfate (all calculated on metal elements) are mixed according to a molar ratio of 70:29:1 in pure water to obtain 2 L of a first mixed solution with the total metal ion concentration of 2 mol/L; mixing phosphoric acid and ammonia water according to a molar ratio of 1:3, and adding pure water to obtain 4 L of second mixed solution with the phosphate radical ion concentration of 1 mol/L; adding PVDF and citric acid into 1 L of pure water to obtain a third mixed solution, wherein the concentration of a complexing agent in the third mixed solution is 0.3 mol/L, and the third mixed solution is used as a reaction base solution;

(b) adding the third mixed solution into a reaction kettle, controlling the temperature at 60° C., dropwise adding the first mixed solution and the second mixed solution into the reaction kettle in a concurrent manner at the stirring speed of 800 rpm, and controlling the pH value in the reaction system to be 6.0±0.5 by adjusting the adding speed of the second mixed solution; after the feeding is finished, continuously stirring for 1 h to obtain first slurry;

(c) and carrying out suction filtration on the first slurry, and washing the first slurry by using pure water until the conductivity of the filtrate is less than or equal to 200 μs/cm to obtain a lithium iron manganese phosphate precursor Z6 with the expression of $(NH_4)Mn_{0.7}Fe_{0.29}Mg_{0.01}PO_4 \cdot H_2O/C$, wherein the carbon content in Z6 is 1.4 wt % based on the total weight of the precursor Z6.

Through scanning electron microscopy, it can be observed that the precursor Z6 has a secondary spherical particle structure formed by primary particles, and the primary particles are bonded compactly, wherein the average particle size of the primary particles is 40 nm, and the average particle size of the secondary spherical particles is 5 μm.

As a result of XRD detection, the precursor Z6 had an orthorhombic crystal structure.

Preparation Example 7

(a) Manganese sulfate and ferric sulfate (both calculated on metal elements) are mixed according to a molar ratio of 70:30 in pure water to obtain 2 L of a first mixed solution with the total metal ion concentration of 2 mol/L; mixing phosphoric acid and ammonia water according to a molar ratio of 1:3, and adding pure water to obtain 4 L of second mixed solution with the phosphate radical ion concentration of 1 mol/L; adding PVDF and triammonium citrate into 1 L of pure water to obtain a third mixed solution, wherein the concentration of a complexing agent in the third mixed solution is 0.05 mol/L, and the third mixed solution is used as a reaction base solution;

(b) adding the third mixed solution into a reaction kettle, controlling the temperature at 60° C., dropwise adding the first mixed solution and the second mixed solution into the reaction kettle in a concurrent manner at the stirring speed of 800 rpm, and controlling the pH value in the reaction system to be 6.0±0.5 by adjusting the adding speed of the second mixed solution; after the feeding is finished, continuously stirring for 1 h to obtain first slurry;

(c) and carrying out suction filtration on the first slurry, and washing the first slurry by using pure water until the conductivity of the filtrate is less than or equal to 200 μs/cm to obtain a lithium iron manganese phosphate precursor Z7 with the expression of $(NH_4)Mn_{0.7}Fe_{0.3}PO_4 \cdot H_2O/C$, wherein the carbon content in Z7 is 1.2 wt % based on the total weight of the precursor Z7.

Through scanning electron microscopy, it can be observed that the precursor Z7 has a secondary spherical particle structure formed by primary particles, and the primary particles are bonded and compact, wherein the average particle size of the primary particles is 80 nm, and the average particle size of the secondary spherical particles is 8 μm.

As a result of XRD detection, the precursor Z7 had an orthorhombic crystal structure.

Comparative Preparation Example 1

A lithium iron manganese phosphate precursor was prepared according to the method of preparation example 1, except that in step (a), the third mixed solution contained no PVDF, to obtain a lithium iron manganese phosphate precursor DZ1 expressed as $(NH_4)Mn_{0.7}Fe_{0.29}Mg_{0.01}PO_4 \cdot H_2O$.

The DZ1 is in a random sheet shape and does not form spherical aggregates as observed by a scanning electron microscopy.

Comparative Preparation Example 2

A lithium iron manganese phosphate precursor was prepared according to the method of preparation example 1, except that in step (a), the first mixed solution contained no magnesium sulfate, and the third mixed solution contained no PVDF, to obtain a lithium iron manganese phosphate precursor DZ2 expressed as $(NH_4)Mn_{0.7}Fe_{0.3}PO_4 \cdot H_2O$.

The scanning electron microscopy can observe that the DZ2 is in a random agglomerated state and does not form a compact spherical agglomerate.

Comparative Preparation Example 3

(a) Manganese sulfate and ferric sulfate (both calculated on metal elements) are mixed according to a molar ratio of 70:30 in pure water to obtain 2 L of a first mixed solution with the total metal ion concentration of 2 mol/L; adding ammonium dihydrogen phosphate into pure water to obtain 2 L of second mixed solution with the phosphate radical ion concentration of 2 mol/L;

(b) adding 1 L of pure water serving as a reaction base solution into a reaction kettle, controlling the temperature at 60° C., dropwise adding the first mixed solution and the second mixed solution into the reaction kettle in a concurrent manner at a stirring speed of 400 rpm, and controlling the pH value in the reaction system to be 6.0±0.5 by adjusting the adding speed of the second mixed solution; after the feeding is finished, continuously stirring for 1 h to obtain first slurry;

(c) and carrying out suction filtration on the first slurry, and cleaning the first slurry by using pure water until the conductivity of the filtrate is less than or equal to 200 μs/cm to obtain a lithium iron manganese phosphate precursor DZ3 with the expression of $(NH_4)Mn_{0.7}Fe_{0.3}PO_4 \cdot H_2O$.

The scanning electron microscopy can observe that the DZ3 is in a random agglomerated state and does not form a compact spherical agglomerate.

Examples 1 to 7 are for explaining a lithium iron manganese phosphate cathode material and a method for producing the same.

Example 1

(1) Mixing the precursor Z1 expressed as $(NH_4)Mn_{0.7}Fe_{0.29}Mg_{0.01}PO_4 \cdot H_2O/C$, lithium carbonate, titanium dioxide and glucose with pure water in a molar ratio of 1:0.52:0.01:0.7, and uniformly mixing the mixture through mechanical stirring to obtain second slurry;

(2) evaporating the second slurry in a charging tray of a heating furnace to dryness, and then putting the second slurry in a vacuum oven at 85° C. for drying for 4 hours to obtain a dry material; calcining the dry material at 650° C. for 10 h in a nitrogen atmosphere, and screening to obtain the lithium iron manganese phosphate cathode material, wherein the lithium iron manganese phosphate cathode material is marked as C1, and the expression of C1 is shown in Table 1.

Figure 2:
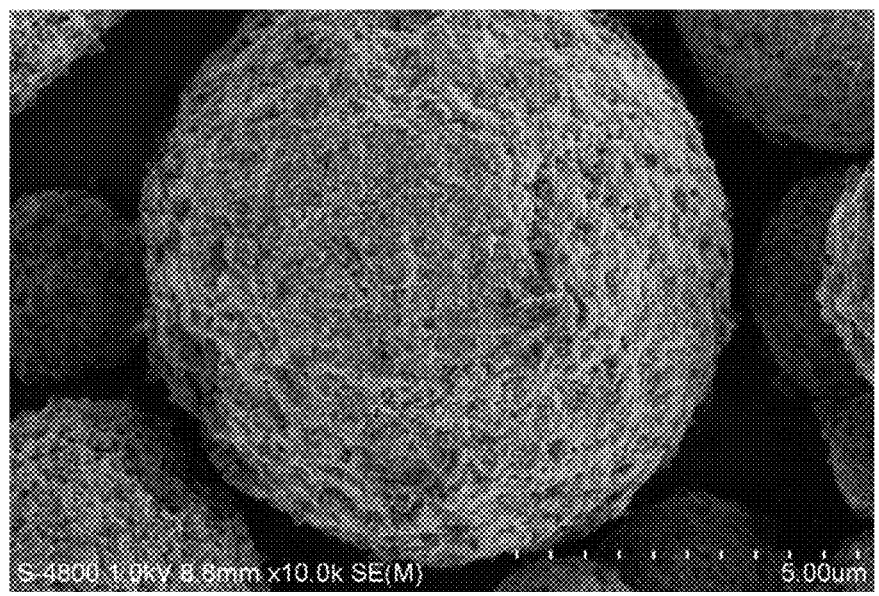
FIG. 2 is a scanning electron microscope image of the lithium iron manganese phosphate cathode material C1 prepared in Example 1.

The morphology of the cathode material C1 was observed by using a scanning electron microscopy, as shown in FIG. 2, it can be seen that the lithium iron manganese phosphate cathode material C1 has a secondary spherical particle structure formed by primary particles, and the primary particles are tightly bonded, wherein the average particle size of the primary particles is 80 nm, and the average particle size of the secondary spherical particles is 9 μm.

The XRD spectrum of the cathode material C1 is shown in FIG. 4, from which it can be seen that the strongest diffraction peak appears at 2θ=35.4°, and distinct diffraction peaks appear at 17.8°, 25.5°, 29.6° and 36.4° of 2θ, respectively, indicating that C1 has the crystal structure of orthorhombic system.

Example 2

(1) Mixing the precursor Z2 expressed as $(NH_4)Mn_{0.6}Fe_{0.39}Mg_{0.01}PO_4H_2O/C$, lithium hydroxide, titanium dioxide and sucrose with pure water according to the molar ratio of 1:1.03:0.01:0.7, and uniformly mixing the mixture through mechanical stirring to obtain second slurry;

(2) evaporating the second slurry in a charging tray of a heating furnace to dryness, and then putting the second slurry in a vacuum oven at 85° C. for drying for 4 hours to obtain a dry material; calcining the dry material at 680° C. for 10 h in a nitrogen atmosphere, and screening to obtain the lithium iron manganese phosphate cathode material, wherein the lithium iron manganese phosphate cathode material is marked as C2, and the expression of C2 is shown in Table 1.

The cathode material C2 was observed by a scanning electron microscope to have a secondary spherical particle structure formed by primary particles, the primary particles were bonded densely, wherein the average particle size of the primary particles was 60 nm, and the average particle size of the secondary spherical particles was 11 μm.

As a result of XRD detection, it was found that the cathode material C2 had an orthorhombic crystal structure.

Example 3

(1) Mixing the precursor Z3 expressed as $(NH_4)Mn_{0.7}Fe_{0.29}Cu_{0.01}PO_4H_2O/C$, lithium chloride, niobium pentoxide and starch with pure water according to the molar ratio of 1:1.05:0.005:0.5, and uniformly mixing the mixture through mechanical stirring to obtain second slurry;

(2) evaporating the second slurry in a charging tray of a heating furnace to dryness, and then putting the second slurry in a vacuum oven at 85° C. for drying for 4 hours to obtain a dry material; calcining the dry material at 700° C. for 12 h in a nitrogen atmosphere, and screening to obtain the lithium iron manganese phosphate cathode material, wherein the lithium iron manganese phosphate cathode material is marked as C3, and the expression of C3 is shown in Table 1.

The cathode material C3 was observed by scanning electron microscopy to have a secondary spherical particle structure formed by primary particles, the primary particles being densely bonded, wherein the average particle size of the primary particles was 100 nm and the average particle size of the secondary spherical particles was 15 μm.

As a result of XRD detection, it was found that the cathode material C3 had an orthorhombic crystal structure.

Example 4

(1) Mixing the precursor Z4 expressed as $(NH_4)Mn_{0.8}Fe_{0.19}Ti_{0.01}PO_4 \cdot H_2O/C$, lithium hydroxide, titanium dioxide and sucrose with pure water according to the molar ratio of 1:1.03:0.01:0.8, and uniformly mixing the mixture through mechanical stirring to obtain second slurry;

(2) evaporating the second slurry in a charging tray of a heating furnace to dryness, and then putting the second slurry in a vacuum oven at 85° C. for drying for 4 hours to obtain a dry material; calcining the dry material at 600° C. for 12 h in a nitrogen atmosphere, and screening to obtain the lithium iron manganese phosphate cathode material, wherein the lithium iron manganese phosphate cathode material is marked as C4, and the expression of C4 is shown in Table 1.

The cathode material C4 was observed by a scanning electron microscope to have a secondary spherical particle structure formed by primary particles, the primary particles are bonded and compact, wherein the average particle size of the primary particles is 80 nm, and the average particle size of the secondary spherical particles is 10 μm.

As a result of XRD detection, it was found that the cathode material C4 had an orthorhombic crystal structure.

Example 5

(1) Mixing the precursor Z5 expressed as $(NH_4)Mn_{0.7}Fe_{0.29}Cu_{0.01}PO_4H_2O/C$, lithium carbonate, boric acid and cellulose with pure water in the molar ratio of 1:1.03:0.01:1, and uniformly mixing the mixture through mechanical stirring to obtain a second slurry;

(2) evaporating the second slurry in a charging tray of a heating furnace to dryness, and then putting the second slurry in a vacuum oven at 85° C. for drying for 4 hours to obtain a dry material; calcining the dry material at 700° C. for 8 h in a nitrogen atmosphere, and screening to obtain the lithium iron manganese phosphate cathode material, wherein the lithium iron manganese phosphate cathode material is marked as C5, and the expression of C5 is shown in Table 1.

The cathode material C5 was observed by a scanning electron microscope to have a secondary spherical particle structure formed by primary particles, the primary particles are bonded and compact, wherein the average particle size of the primary particles is 70 nm, and the average particle size of the secondary spherical particles is 8 μm.

As a result of XRD detection, it was found that the cathode material C5 had an orthorhombic crystal structure.

Example 6

(1) Mixing the precursor Z6 expressed as $(NH_4)Mn_{0.7}Fe_{0.29}Mg_{0.01}PO_4 \cdot H_2O/C$, lithium carbonate, lithium fluoride and glucose with pure water according to the molar ratio of 1:0.52:0.01:0.7, and uniformly mixing the mixture through mechanical stirring to obtain second slurry;
(2) evaporating the second slurry in a charging tray of a heating furnace to dryness, and then putting the second slurry in a vacuum oven at 85° C. for drying for 4 hours to obtain a dry material; calcining the dry material at 650° C. for 10 h in a nitrogen atmosphere, and screening to obtain the lithium iron manganese phosphate cathode material, wherein the lithium iron manganese phosphate cathode material is marked as C6, and the expression of C6 is shown in Table 1.

The cathode material C6 was observed by a scanning electron microscope to have a secondary spherical particle structure formed by primary particles, the primary particles were bonded densely, wherein the average particle size of the primary particles was 60 nm, and the average particle size of the secondary spherical particles was 7 μm.

As a result of XRD detection, it was found that the cathode material C6 had an orthorhombic crystal structure.

Example 7

A lithium iron manganese phosphate cathode material was prepared as in example 1, except that the precursor used was Z7, which was expressed as $(NH_4)Mn_{0.7}Fe_{0.3}PO_4 \cdot H_2O/C$, the resulting cathode material was denoted as C7, and the expression of C7 is shown in Table 1.

The cathode material C7 had a secondary spherical particle structure formed by primary particles, which were bonded densely, as observed by a scanning electron microscope, wherein the average particle size of the primary particles was 90 nm, and the average particle size of the secondary spherical particles was 10 μm.

As a result of XRD detection, it was found that the cathode material C7 had an orthorhombic crystal structure.

Comparative Example 1

(1) Mixing the precursor Z7 expressed as $(NH_4)Mn_{0.7}Fe_{0.3}PO_4 \cdot H_2O/C$, lithium carbonate and glucose with pure water according to the molar ratio of 1:0.52:0.7, and uniformly mixing the mixture through mechanical stirring to obtain second slurry;
(2) evaporating the second slurry in a charging tray of a heating furnace to dryness, and then putting the second slurry in a vacuum oven at 85° C. for drying for 4 hours to obtain a dry material; calcining the dry material at 650° C. for 10 h in a nitrogen atmosphere, and screening to obtain the lithium iron manganese phosphate cathode material, wherein D1 is recorded, and the expression of D1 is shown in Table 1.

The cathode material D1 was observed by a scanning electron microscope to have a secondary spherical particle structure formed by primary particles, the primary particles are bonded and compact, wherein the average particle size of the primary particles is 90 nm, and the average particle size of the secondary spherical particles is 10 μm.

Comparative Example 2

A lithium iron manganese phosphate cathode material was prepared as in example 1, except that the precursor used was DZ1 (expressed as $(NH_4)Mn_{0.7}Fe_{0.29}Mg_{0.01}PO_4 \cdot H_2O$), the resulting cathode material was denoted as D2, and the expression of D2 is shown in table 1.

The scanning electron microscope can observe that the cathode material D2 is in a random agglomerated state and does not form a compact spherical agglomerate.

Comparative Example 3

The procedure of example 1 was followed, except that a lithium iron manganese phosphate cathode material was prepared using a precursor DZ2 (expressed as $(NH_4)Mn_{0.7}Fe_{0.3}PO_4 \cdot H_2O$), and the obtained cathode material was denoted as D3, and the expression of D3 is shown in table 1.

The scanning electron microscope can observe that the cathode material D3 is in a random agglomerated state and does not form a compact spherical agglomerate.

Comparative Example 4

(1) Mixing the precursor DZ3 expressed as $(NH_4)Mn_{0.7}Fe_{0.3}PO_4 \cdot H_2O$, lithium carbonate and glucose with pure water in a molar ratio of 1:0.51:1, and uniformly mixing the mixture by mechanical stirring to obtain a second slurry;
(2) evaporating the second slurry in a charging tray of a heating furnace to dryness, and then putting the second slurry in a vacuum oven at 85° C. for drying for 4 hours to obtain a dry material; calcining the dry material at 650° C. for 10 h in a nitrogen atmosphere, and screening to obtain the lithium iron manganese phosphate cathode material, wherein D4 is recorded, and the expression of D4 is shown in Table 1.

Figure 3:
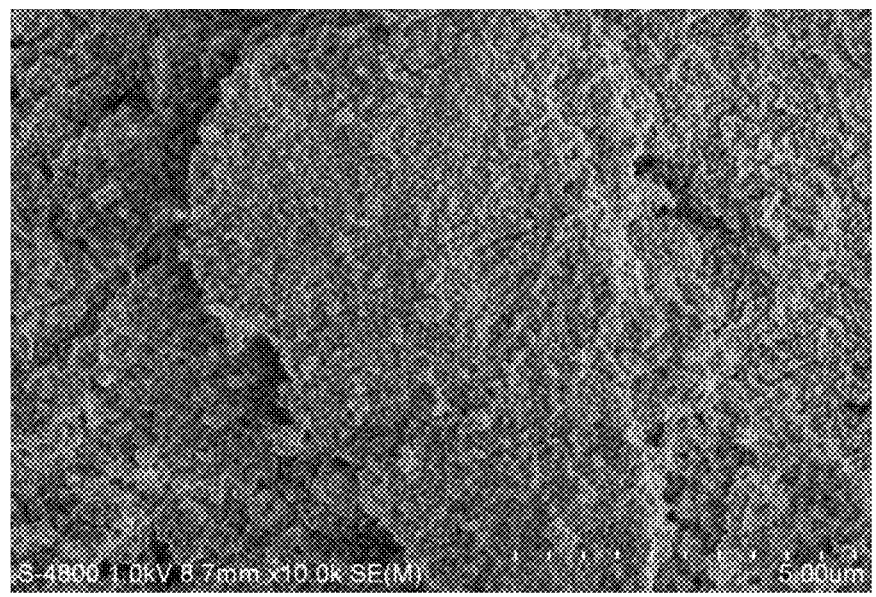
FIG. 3 is a scanning electron microscope image of the lithium iron manganese phosphate cathode material D4 prepared in Comparative example 4.

The morphology of the cathode material D4 is observed by a scanning electron microscope, as shown in FIG. 3, it can be seen that D4 is in a random agglomerated state, and a dense agglomerate is not formed.

Comparative Example 5

(1) Mixing the precursor DZ3 expressed as $(NH_4)Mn_{0.7}Fe_{0.3}PO_4 \cdot H_2O$, lithium hydroxide, magnesium carbonate and sucrose with pure water according to the molar ratio of 1:1.03:0.01:0.7, and grinding the mixture in a planetary ball mill to obtain second slurry;
(2) spray drying the second slurry to obtain a dry material; calcining the dry material at 630° C. for 10 hours in a nitrogen atmosphere, crushing by using an airflow mill, and screening to obtain the lithium iron manganese phosphate cathode material, wherein the expression of D5 is shown in Table 1.

It can be observed by scanning electron microscope that D5 is in random agglomerated form, and does not form compact agglomerates.

Test Example 5

The test examples are used to illustrate electrode materials, electrodes, lithium ion batteries, and methods of making the same.
(1) Preparing a positive pole piece: respectively mixing the lithium iron manganese phosphate cathode materials C1-C7 obtained in Examples 1-7, a conductive agent carbon nanotube and an NMP solution of a binder PVDF in a mass ratio of 90:5:5. The specific method comprises the following steps: grinding the dried cathode material and the conductive agent in a mortar for 15 minutes, adding a PVDF solution (5 mass percent) according to a ratio after grinding uniformly, and stirring for 6 hours on a magnetic stirrer; and uniformly coating the obtained paste slurry on a current collector aluminum foil, drying for 20 hours in a vacuum drying oven at 6° C., performing punch forming under the pressure of 100 MPa to obtain a positive pole piece with the diameter of 12 mm and the thickness of 120 μm, and drying the positive pole piece in the vacuum drying oven at 120° C. for 12 hours.
(2) Assembling the battery: a metal lithium sheet with the diameter of 17 mm and the thickness of 1 mm is used as a negative electrode, a polyethylene porous membrane with the surface coated with an aluminum oxide ceramic layer and the thickness of 25 μm is used as a separator, a mixed solution of 1 mol/L of $LiPF_6$, ethylene carbonate (EC) and diethyl carbonate (DEC) in equal amount is used as an electrolyte, and the positive pole piece, the separator, the negative pole piece and the electrolyte are assembled into a 2025 type button cell in an Ar glove box with the water content and the oxygen content of less than 5 ppm, so that the lithium ion battery A1-A7 is respectively prepared.
(3) And electrochemical performance testing: the battery was subjected to a charge and discharge test using a blue-electron LAND CT2001A charge and discharge instrument of wuhan lanbo electronics ltd, with a charge and discharge voltage range of 2.5 V to 4.4V, the assembled lithium ion battery A1-A7 was subjected to a specific capacity test at 0.1C and 1C magnifications, respectively, and a cycle stability test at 1C magnifications, with the test results shown in Table 1.

Comparative Test Example (1) Preparing a positive pole piece: the preparation of the positive pole piece was carried out according to the method of the Test example, except that the positive active materials used were the lithium iron manganese phosphate cathode materials D1-D5 obtained in Comparative examples 1-5, respectively.
(2) Assembling the battery: the procedure was as in Test example.
(3) And electrochemical performance testing: the test was carried out according to the method of Test example, and the test results are shown in Table 1.

Figure 5:
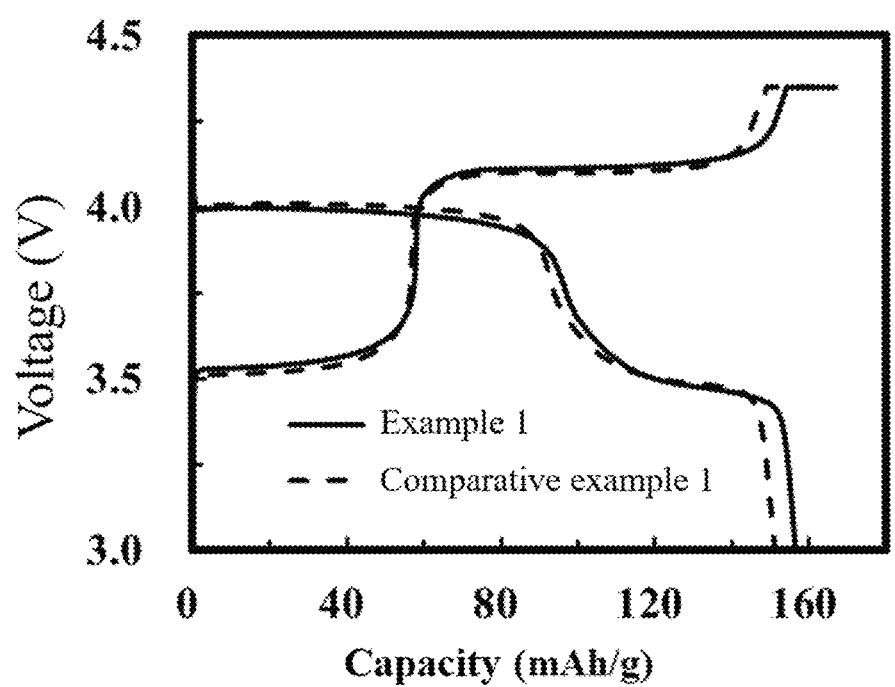
FIG. 5 is a charge-discharge curve diagram of the lithium iron manganese phosphate cathode material C1 obtained in Example 1 and the lithium iron manganese phosphate cathode material D1 obtained in Comparative example 1 at a 0.1C rate.

The charging and discharging curves of the lithium manganese iron phosphate cathode material C1 prepared in Example 1 and the lithium manganese iron phosphate cathode material D1 prepared in Comparative example 1 at the rate of 0.1C are shown in FIG. 5, and it can be seen from the figure that the button cell assembled by the cathode material C1 has a specific discharge capacity of 156.8 mAh/g at the rate of 0.1C and a specific discharge capacity of 149.7 mAh/g at the rate of 1C, and the capacity retention rate after 80 cycles is 95.8%. Compared with the cathode material D1 of Comparative example 1, the cathode material C1 of Example 1 has significantly improved specific discharge capacity at 0.1C and 1C multiplying power and capacity retention rate after 80 cycles.

TABLE 1

| Cathode material | Expression | The carbon element content wt % | Compaction density g/cm³ | Specific discharge capacity mAh/g 0.1 C | Specific discharge capacity mAh/g 1 C | Cycle capacity retention rate after 80 cycles % |
|---|---|---|---|---|---|---|
| C1 | $Li_{1.04}Mn_{0.68}Fe_{0.29}Mg_{0.01}Ti_{0.01}PO_4/C$ | 1.8 | 2.31 | 156.8 | 149.7 | 95.8 |
| C2 | $Li_{1.03}Mn_{0.59}Fe_{0.39}Mg_{0.01}Ti_{0.01}PO_4/C$ | 1.9 | 2.26 | 157.2 | 148.2 | 94.9 |
| C3 | $Li_{1.03}Mn_{0.69}Fe_{0.29}Cu_{0.01}Nb_{0.01}PO_4/C$ | 3.0 | 2.20 | 152.5 | 139.5 | 95.1 |
| C4 | $Li_{1.03}Mn_{0.79}Fe_{0.19}Ti_{0.02}PO_4/C$ | 2.2 | 2.21 | 153.2 | 137.5 | 92.6 |
| C5 | $Li_{1.03}Mn_{0.69}Fe_{0.29}Cu_{0.01}B_{0.01}PO_4/C$ | 1.8 | 2.12 | 152.1 | 140.2 | 93.5 |
| C6 | $Li_{1.05}Mn_{0.7}Fe_{0.29}Mg_{0.01}(PO_4)_{0.99}F_{0.01}/C$ | 2.0 | 2.09 | 155.4 | 145.3 | 95.9 |
| C7 | $Li_{1.04}Mn_{0.69}Fe_{0.3}Ti_{0.01}PO_4/C$ | 1.8 | 2.28 | 154.6 | 145.8 | 92.6 |
| D1 | $Li_{1.04}Mn_{0.7}Fe_{0.3}PO_4/C$ | 1.8 | 2.30 | 151.2 | 138.0 | 88.3 |
| D2 | $Li_{1.04}Mn_{0.68}Fe_{0.29}Mg_{0.01}Ti_{0.01}PO_4/C$ | 1.2 | 1.92 | 155.2 | 146.5 | 91.5 |
| D3 | $Li_{1.04}Mn_{0.69}Fe_{0.3}Ti_{0.01}PO_4/C$ | 1.2 | 1.88 | 150.1 | 141.3 | 89.3 |
| D4 | $Li_{1.02}Mn_{0.7}Fe_{0.3}PO_4/C$ | 1.6 | 1.67 | 143.2 | 131.0 | 82.3 |
| D5 | $Li_{1.03}Mn_{0.7}Fe_{0.29}Mg_{0.01}PO_4/C$ | 1.8 | 1.42 | 148.5 | 137.6 | 86.5 |

The results in Table 1 show that the lithium iron manganese phosphate cathode material provided by the present invention has high compaction density, and can significantly improve the specific capacity and cycle stability of a lithium ion battery when being applied to the lithium ion battery.

The preferred embodiments of the present invention have been described above in detail, but the present invention is not limited thereto. Within the scope of the technical idea of the invention, many simple modifications can be made to the technical solution of the invention, including various technical features being combined in any other suitable way, and these simple modifications and combinations should also be regarded as the disclosure of the invention, and all fall within the scope of the invention.

The invention claimed is:

1. A method for preparing a lithium iron manganese phosphate cathode material, comprising the following steps:
   (1) providing a lithium iron manganese phosphate precursor represented by Formula 1: $(NH_4)Mn_{1-x-y}Fe_xM_yPO_4 \cdot H_2O/C$,
   wherein $0.1 < x \leq 0.6$ and $0.01 \leq y \leq 0.04$, and M is selected from Mg, Co, Ni, Cu, Zn, Ti, or a combination thereof; wherein the precursor has a secondary spherical particle structure formed of primary particles; an average particle size of the primary particles of the precursor is 10 nm to 500 nm; an average particle size of the secondary spherical particles is 1 µm to 50 µm; the precursor has a crystal structure of an orthorhombic system;
   (2) in presence of a solvent, mixing and homogenizing the lithium iron manganese phosphate precursor, a lithium source, a second carbon source, an M' source and/or an N source to obtain a second slurry; and
   (3) removing the solvent in the second slurry to obtain a dry material, and calcining the dry material under protection of an inert atmosphere to obtain the lithium iron manganese phosphate cathode material,
   wherein the lithium iron manganese phosphate cathode material is reported by formula 2: $Li_iMn_{1-x-y-z}Fe_xM_yM'_z(PO_4)_{1-n}N_n/C$,
   wherein $0.1 < x \leq 0.6$, $0.01 \leq y \leq 0.04$, $0 \leq z \leq 0.04$, $0.9 < i \leq 1.2$ and $0 \leq n \leq 0.04$, and z and n are not 0 at the same time;
   M is selected from Mg, Co, Ni, Cu, Zn, Ti, or a combination thereof;
   M' is selected from Mg, Ca, Sr, Ti, V, Cr, Co, Ni, Cu, Zn, Zr, Y, Mo, Nb, B, Al, W, La, Sm, or a combination thereof; and
   N is selected from F, Cl, or a combination thereof, and
   wherein the lithium iron manganese phosphate cathode material has a secondary spherical particle structure formed of primary particles; an average particle size of the primary particles of the lithium iron manganese phosphate cathode material is 10 nm to 500 nm; a surface of the primary particles is uniformly coated with carbon; an average particle size of the secondary spherical particles is from 1 µm to 50 µm; a surface of secondary spherical particles is coated with carbon; and the lithium iron manganese phosphate cathode material has a crystal structure of an orthorhombic system.

2. The method according to claim 1, wherein in step (2), the lithium source is selected from lithium oxide, lithium hydroxide, lithium chloride, lithium nitrate, lithium nitrite, lithium formate, lithium acetate, lithium oxalate, lithium carbonate, lithium phosphate, dilithium hydrogen phosphate, lithium dihydrogen phosphate, lithium citrate, or a combination thereof; and/or
   the second carbon source is selected from glucose, sucrose, fructose, cellulose, starch, citric acid, polyacrylic acid, polyethylene glycol, dopamine, or a combination thereof; and/or
   the M' source is selected from oxygenated compounds containing M' and/or chlorides containing M'; and/or
   the N source is selected from ammonium fluoride, ammonium bifluoride, lithium fluoride, ammonium chloride, lithium chloride, or a combination thereof.

3. The method according to claim 2, wherein in step (2), the lithium source is selected from lithium carbonate, lithium hydroxide, lithium chloride, or a combination thereof; and/or
   the second carbon source is selected from glucose, sucrose, starch, cellulose, or a combination thereof; and/or
   the M' source is selected from at least one of titanium dioxide, niobium pentoxide, boric acid, or a combination thereof; and/or
   the N source is lithium fluoride.

4. The method according to claim 1, wherein a molar ratio of the lithium iron manganese phosphate precursor, lithium source, M' source, and/or N source to the second carbon source is 1:0.52-1.05:0.005-0.01:0.5-1.

5. The method according to claim 1, wherein in step (3), calcining conditions comprise: calcination temperature of 500° C. to 1000° C.; calcination time of 4 h to 20 h; and/or inert atmosphere that is a nitrogen atmosphere and/or an argon atmosphere.

6. The method according to claim 5, wherein in step (3), the calcination temperature is 600° C. to 800° C.; and the calcination time is 6 h to 12 h.

7. The method according to claim 1, wherein a carbon element content in the lithium iron manganese phosphate precursor is from 0.05 wt % to 5 wt %, based on a total weight of the lithium iron manganese phosphate precursor;
   in the Formulas 1 and 2, $0.19 \leq x \leq 0.39$ and $0.01 \leq y \leq 0.04$; and/or
   M is selected from Mg, Cu, Ti, or a combination thereof.

8. The method according to claim 1, wherein the average particle size of the secondary spherical particles is 5 µm to 12 µm; and/or the average particle size of the primary particles of the precursor is 40 nm to 100 nm.

9. The method according to claim 1, wherein a method for preparing the lithium iron manganese phosphate precursor, comprises the following steps:
   (a) providing a first mixed solution containing a manganese source, an iron source, and optionally an M source; providing a second mixed solution containing a phosphorus source and an ammonia source; providing a third mixed solution containing a complexing agent and a first carbon source;
   (b) adding the first mixed solution and the second mixed solution into the third mixed solution for coprecipitation reaction to obtain first slurry; and
   (c) carrying out solid-liquid separation and washing on the first slurry to obtain a lithium iron manganese phosphate precursor.

10. The method according to claim 1, wherein a carbon element content in the lithium iron manganese phosphate cathode material is 0.5 wt % to 10 wt %, based on a total weight of the lithium iron manganese phosphate cathode material.

11. The method according to claim 10, wherein the carbon element content in the lithium iron manganese phosphate cathode material is 1 wt % to 3 wt %, based on a total weight of the cathode material.

12. The method according to claim 11, wherein the carbon element content in the lithium iron manganese phosphate cathode material is 1.8 wt % to 3 wt %, based on a total weight of the cathode material.

13. The method according to claim 1, wherein in the Formula 2, $0.19 \leq x \leq 0.39$, $0.01 \leq y \leq 0.04$, $0.01 \leq z \leq 0.04$, $1 \leq i \leq 1.1$ and $0.01 \leq n \leq 0.04$; and/or
   M is selected from Mg, Cu, Ti, or a combination thereof; and/or, M' is selected from Ti, Nb, B, or a combination thereof; and/or, N is F.

14. The method according to claim 13, wherein in the Formula 2, $0.19 \leq x \leq 0.39$, $0.01 \leq y \leq 0.04$, $0.01 \leq z \leq 0.02$, $1.02 \leq i \leq 1.05$ and $0.01 \leq n \leq 0.02$.

15. The method according to claim 1, wherein the average particle size of the primary particles of the lithium iron manganese phosphate cathode material is 60 nm to 100 nm; and/or
 a compaction density of the lithium iron manganese phosphate cathode material is 1.5 g/cm$^3$ to 2.5 g/cm$^3$, a specific capacity at 0.1C rate is 145 mAh/g to 160 mAh/g, and a capacity retention rate after 80 cycles is 85% to 97%.

16. The method according to claim 1, wherein a compaction density of the lithium iron manganese phosphate cathode material is 2.09 g/cm$^3$ to 2.31 g/cm$^3$, a specific capacity at 0.1C rate is 152.1 mAh/g to 157.2 mAh/g, and a capacity retention rate after 80 cycles is 92.6% to 95.9%.

* * * * *